United States Patent
Gong et al.

(10) Patent No.: US 9,641,021 B2
(45) Date of Patent: May 2, 2017

(54) PHOTOVOLTAIC POWER GENERATION SYSTEM INCLUDING APPARATUS AND METHOD TO BUFFER POWER FLUCTUATIONS

(71) Applicant: General Electric Company, Schenectady, NY (US)

(72) Inventors: Maozhong Gong, Latham, NY (US); Bruce Gordon Norman, Burnt Hills, NY (US)

(73) Assignee: General Electric Company, Niskayuna, NY (US)

(*) Notice: Subject to any disclaimer, the term of this patent is extended or adjusted under 35 U.S.C. 154(b) by 1012 days.

(21) Appl. No.: 13/755,125

(22) Filed: Jan. 31, 2013

(65) Prior Publication Data

US 2014/0210275 A1    Jul. 31, 2014

(51) Int. Cl.
*H02J 1/00* (2006.01)
*H02J 7/35* (2006.01)
(Continued)

(52) U.S. Cl.
CPC ............. *H02J 7/35* (2013.01); *H02J 3/383* (2013.01); *H02J 3/385* (2013.01); *H02J 7/345* (2013.01);
(Continued)

(58) Field of Classification Search
CPC ..... H02J 3/383–3/385; H02J 7/34–7/35; H02J 1/00; Y02E 10/566
(Continued)

(56) References Cited

U.S. PATENT DOCUMENTS 4,636,931 A    1/1987    Takahashi et al.
9,118,212 B2 *  8/2015    Hantschel ................. H02J 7/35
(Continued)

FOREIGN PATENT DOCUMENTS

JP    2007060796 A      3/2007
JP    2012095418 A  *   5/2012

OTHER PUBLICATIONS

Giraud et al., "Analysis of the Effects of a Passing Cloud on a Grid-Interactive Photovoltaic System With Battery Storage Using Neural Networks", IEEE Transactions on Energy Conversion, vol. 14, Issue 4, pp. 1572-1577, Dec. 1999.
(Continued)

*Primary Examiner* — Dharti Patel
(74) *Attorney, Agent, or Firm* — Nitin N. Joshi

(57) ABSTRACT

A power generation system, apparatus and method to buffer power fluctuations are provided. At least one inverter (14) may be coupled to a photovoltaic power generator (10). The inverter may be subject to at least one operational constraint. A power-buffering circuitry (16) may be connected between the photovoltaic power generator and the inverter to buffer power generation fluctuations which can occur in power generated by the photovoltaic power generator, and satisfy the operational constraint of the inverter notwithstanding an occurrence of the power generation fluctuations. A controller (14) may be coupled to the power-buffering circuitry and may be responsive to the parameter of the photovoltaic power generator to perform at least one control action regarding the power fluctuations. Control actions may be performed by the controller independently of a control strategy of the inverter.

29 Claims, 7 Drawing Sheets

(51) Int. Cl.
*H02J 3/38* (2006.01)
*H02J 7/34* (2006.01)

(52) U.S. Cl.
CPC ........... *Y02E 10/563* (2013.01); *Y02E 10/566* (2013.01); *Y02E 10/58* (2013.01); *Y10T 29/49117* (2015.01); *Y10T 307/707* (2015.04)

(58) Field of Classification Search
USPC .......................................................... 307/77
See application file for complete search history.

(56) References Cited

U.S. PATENT DOCUMENTS

| | | | |
|---|---|---|---|
| 9,401,662 B2* | 7/2016 | Bettenwort | H02J 3/383 |
| 2010/0057267 A1 | 3/2010 | Liu et al. | |
| 2010/0231045 A1* | 9/2010 | Collins | F01B 21/04 |
| | | | 307/47 |
| 2010/0309692 A1 | 12/2010 | Chisenga et al. | |
| 2011/0089886 A1 | 4/2011 | Dubovsky | |
| 2011/0140520 A1 | 6/2011 | Lee | |
| 2011/0221276 A1* | 9/2011 | Geinzer | H02J 3/32 |
| | | | 307/66 |
| 2011/0232714 A1 | 9/2011 | Bhavaraju et al. | |
| 2011/0282514 A1 | 11/2011 | Ropp et al. | |
| 2012/0261990 A1 | 10/2012 | Collins et al. | |
| 2014/0132075 A1* | 5/2014 | Fishman | H02J 3/383 |
| | | | 307/82 |
| 2014/0169053 A1* | 6/2014 | Ilic | H02M 7/53873 |
| | | | 363/132 |

OTHER PUBLICATIONS

Ding et al., "Modeling and Simulation of Grid-Connected Hybrid Photovoltaic/Battery Distributed Generation System", China International Conference on Electricity Distribution (CICED), pp. 1-10, Sep. 13-16, 2010, Location: Nanjing.

"Ingeteam Develops Inverter to Manage Energy Storage at Solar PV Power Plants", RenewableUK Annual Conference & Exhibition, Oct. 17, 2012, Product Catalogue.

* cited by examiner

PHOTOVOLTAIC POWER GENERATION SYSTEM INCLUDING APPARATUS AND METHOD TO BUFFER POWER FLUCTUATIONS

FIELD OF THE INVENTION

The present invention is generally related to power generation, as may involve a photovoltaic power generator for generating electrical power, which may fluctuate due to one or more weather-varying factors, such as solar irradiance, temperature, cloud coverage, and, more particularly, to a power generation system including power-buffering circuitry arranged to buffer the power fluctuations and reduce influences of such weather-varying factors.

BACKGROUND OF THE INVENTION

Large-scale generation of electric power based on a freely-available, essentially inexhaustible natural resource, such as solar irradiance, continues progressing as an attractive modality for clean and efficient generation of electric power. The weather-induced variability of the natural resource (e.g., due to cloud coverage variability) may cause challenges at various levels, such as at a component level (e.g., inverter), at a subsystem level, at a distribution level as well as on the larger power grid.

In view of the foregoing considerations, it would be desirable to provide apparatus arranged to buffer the power fluctuations and reduce influences of such weather-varying factors.

SUMMARY OF THE INVENTION

Generally, aspects of the present invention in one example embodiment may provide a power generation system including a photovoltaic power generator. At least one inverter may be coupled to the photovoltaic power generator. The inverter may be subject to at least one operational constraint. A power-buffering circuitry may be connected between the photovoltaic power generator and the inverter to buffer power generation fluctuations which can occur in power generated by the photovoltaic power generator, and satisfy the operational constraint of the inverter notwithstanding an occurrence of the power generation fluctuations. A controller may be coupled to the power-buffering circuitry and may be responsive to the parameter of the photovoltaic power generator to perform at least one control action regarding the power fluctuations. The control actions may be performed by the controller independently of a control strategy of the inverter.

Further aspects of the present invention in another example embodiment may provide apparatus including a power-buffering circuitry connected downstream from a photovoltaic power generator and upstream from at least one inverter coupled to the photovoltaic power generator. The inverter may be subject to at least one operational constraint. The power-buffering circuitry may be arranged to buffer power generation fluctuations which can occur in power generated by the photovoltaic power generator, and satisfy the operational constraint of the inverter notwithstanding an occurrence of the power generation fluctuations. A controller may be coupled to the power-buffering circuitry and may be responsive to the parameter of the photovoltaic power generator to perform at least one control action regarding the power fluctuations. The control actions may be performed by the controller independently of a control strategy of the inverter.

Still further aspects of the present invention in another example embodiment may provide a method to buffer power generation fluctuations in a photovoltaic power generator. The method may allow coupling at least one inverter to a photovoltaic power generator. The inverter may be subject to at least one operational constraint. The method may further allow connecting a power-buffering circuitry between the photovoltaic power generator and the inverter. The power-buffering circuitry may be controlled by way of a controller to buffer power generation fluctuations which can occur in power generated by the photovoltaic power generator, and satisfy the operational constraint of the inverter notwithstanding an occurrence of the power generation fluctuations. The controller may be configured to be responsive to the parameter of the photovoltaic power generator to perform at least one control action regarding the power fluctuations. The control actions may be performed by the controller independently of a control strategy of the inverter.

BRIEF DESCRIPTION OF THE DRAWINGS

The invention is explained in the following description in view of the drawings that show.

DETAILED DESCRIPTION OF THE INVENTION

Figure 1:
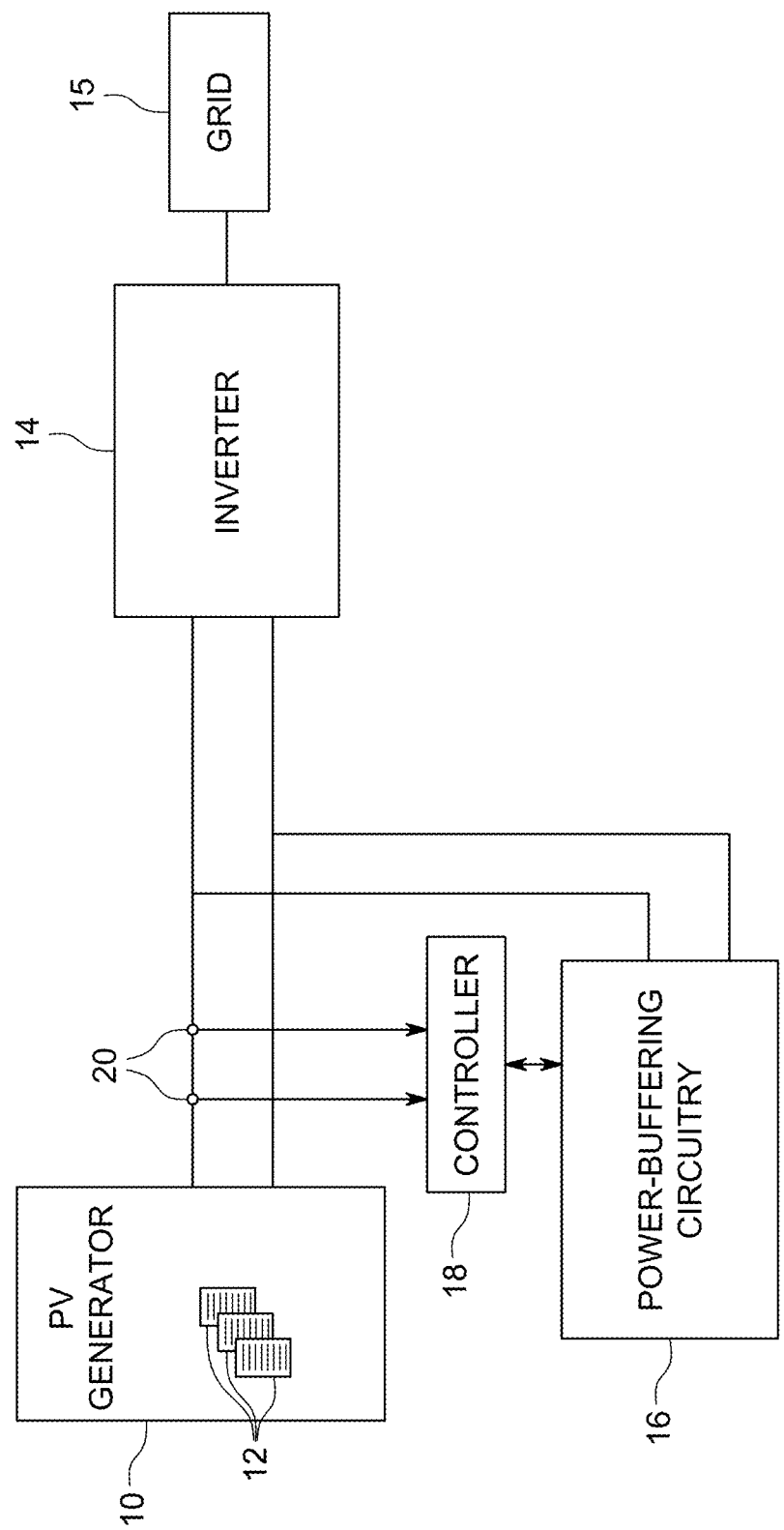
FIG. 1 primarily shows a block diagram representation of one example embodiment of a power generation system embodying aspects of the present invention.

In the following detailed description, numerous specific details are set forth in order to provide a thorough understanding of various embodiments of the present invention. However, those skilled in the art will understand that embodiments of the present invention may be practiced without these specific details, that the present invention is not limited to the depicted embodiments, and that the present invention may be practiced in a variety of alternative embodiments. In other instances, to avoid pedantic and unnecessary description well known methods, procedures, and components have not been described in detail.

Furthermore, various operations may be described as multiple discrete steps performed in a manner that is helpful for understanding embodiments of the present invention. However, the order of description should not be construed as to imply that these operations need be performed in the order they are presented, nor that they are even order dependent.

As used herein, the term "module" (or "circuitry") may refer to software, hardware, firmware, or any combination of these, or any system, process, structure or functionality that may perform or facilitate the processes described herein. Repeated usage of the phrase "in one embodiment" does not necessarily refer to the same embodiment, although it may. Lastly, the terms "comprising", "including", "having", and the like, as used in the present application, are intended to be synonymous unless otherwise indicated.

In one example embodiment, a power generation system embodying aspects of the present invention may include a photovoltaic (PV) power generator 10, as may be made up of an array of photovoltaic modules 12. As will be appreciated by one skilled in the art, photovoltaic arrays naturally produce direct current (DC) power output when exposed to solar irradiance. Thus, at least one inverter 14 may be used for converting the DC output from the photovoltaic array to an alternating current (AC) signal appropriate for coupling to, for example, a power grid 15. Inverter 14 may be subject to one or more operational constraints, such as power rating, current rating, voltage rating, temperature rating of one or more components of the inverter, etc.

A power-buffering circuitry 16 may be connected between photovoltaic power generator 10 and inverter 14 (e.g., downstream from photovoltaic power generator 10 and upstream from inverter 14) to buffer power generation fluctuations which can occur in the electrical power generated by the photovoltaic power generator. For example, solar irradiance may vary based on varying cloud conditions, which can lead to fluctuations in the power generating conditions of the array of photovoltaic modules 12. The buffering of power generation fluctuations provided by power-buffering circuitry 16 may be arranged to satisfy the operational constraints of the inverter notwithstanding occurrence of such power generation fluctuations.

A component topology embodying aspects of the present invention (e.g., power-buffering circuitry 16 being downstream from photovoltaic power generator 10 and upstream from inverter 14) can advantageously capture surplus power from the photovoltaic power generator 10 independently of the power rating of inverter 14 since in this topology the surplus power from the photovoltaic power generator 10 does not need to go through the power switching circuits of inverter 14, and therefore this topology is practically independent of the power rating of the inverter. Compare the foregoing aspects of the present invention to certain known inverter-energy storage systems where, for example, the PV power may be directly tied to the inverter, and thus one cannot capture surplus PV power which is greater than the inverter power rating because in such systems the surplus power has to go through the inverter and therefore is limited by the power rating of the inverter.

A controller 18 is coupled to power-buffering circuitry 16, and in one example embodiment, controller 18 may be responsive to one or more parameters (e.g., generated voltage and current) of photovoltaic power generator 10 to perform at least one control action regarding the power fluctuations. In another example embodiment, controller 18 may further be responsive to data indicative of a change in an operational state (or mode) of inverter 14 and/or sensed inverter parameters, which may be indicative of such changes in the operational states of the inverter to perform the control actions regarding the powers fluctuations. For example, in a situation where the DC power rating of the power generation system (e.g., PV power rating) may be greater than the AC power rating (e.g., inverter rating), the PV arrays may naturally generate relatively more power during noon time than can be handled by the inverter. Under this situation, the inverter may change its operation from a maximum power point tracking (MPPT) state to a power limiting state. This state change may cause a detectable change in the operating PV voltage and/or PV current. In one example embodiment, controller 18 may be configured to detect such a change in voltage and/or current and control the buffering circuitry accordingly. It is noted that the foregoing example of state change detection should be construed in an example sense and not in a limiting sense since many additional types of inverter state detection may be utilized to control the power-buffering circuitry.

Figure 2:
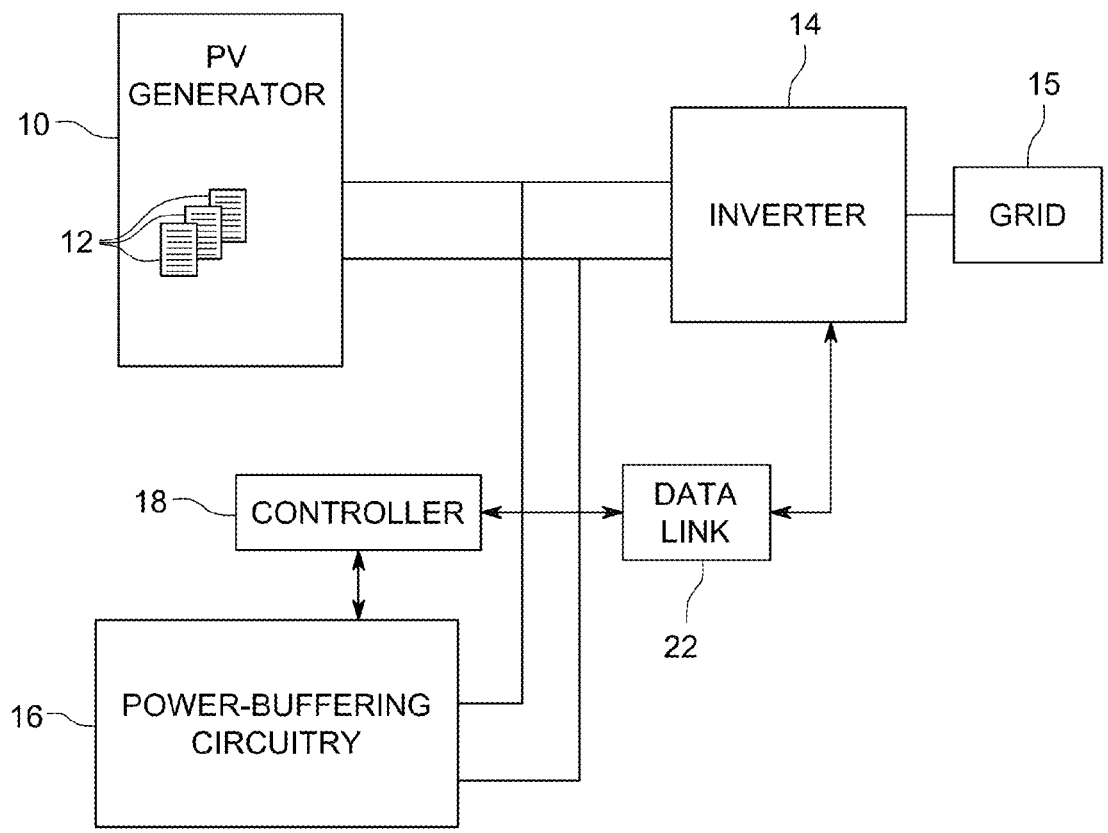
FIG. 2 primarily shows a block diagram representation of another example embodiment of a power generation system embodying aspects of the present invention.

Another desirable aspect of the present invention may be that the control actions performed by controller 18 may be independently performed of a control strategy of the inverter. For example, the inverter control strategy may comprise a maximum power point tracking (MPPT). Thus, from the point of view of controller 18, the inverter control (e.g., a maximum power point tracker) may be conceptually analogized to a black box. That is, controller 18 is effectively decoupled from any specific control algorithm, which may be utilized by a given inverter. This may provide substantial integration flexibility to a system designer since controller 18 and power-buffering circuitry 16 may be readily integrated into a power generation system embodying aspects of the present invention without regards to the specific control algorithm, which may be utilized by a given inverter In one example embodiment, one or more sensors 20 may be provided to sense one or more parameters (e.g., voltage, current) of photovoltaic power generator 10 and/or inverter 14. In another example embodiment, as illustrated in FIG. 2, a data link 22 may be used to monitor parameters of photovoltaic power generator 10 and/or inverter 14 and may further include capability to monitor data indicative of changes in the operational states of inverter 14.

Figure 3:
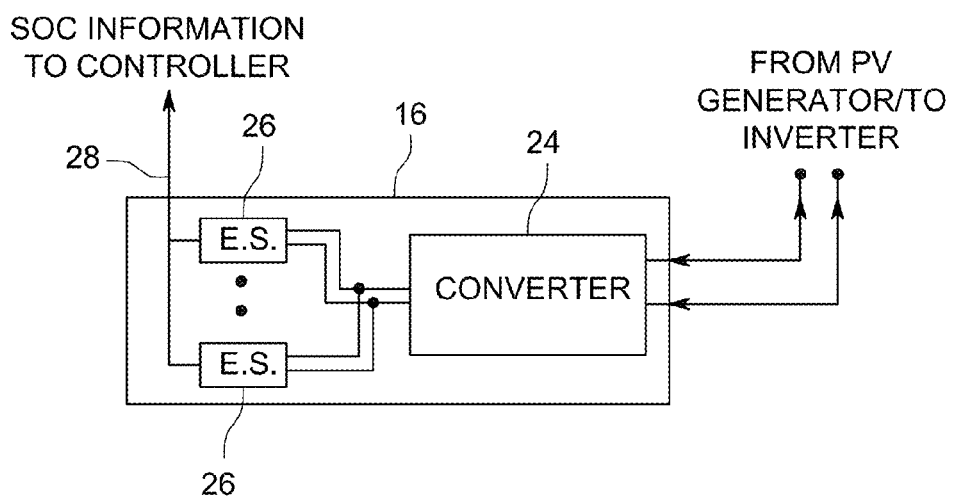
FIG. 3 is a block diagram representation of one example embodiment of a power-buffering circuitry, as may be used by a power generation system embodying aspects of the present invention.

As illustrated in the block diagram representation shown in FIG. 3, in one example embodiment, power-buffering circuitry 16 may be made up of a converter 24 (e.g., a boost type DC-to-DC converter, or similar) and one or more electrical energy storage devices 26 (labeled E.S.). In one example embodiment, electrical storage devices 26 may comprise at least one of the following energy storage devices: rechargeable batteries, capacitor banks, inductors, and/or super-capacitors.

In one example embodiment, one or more electrical energy storage devices 26 may be selected based on a desired objective to meet with excess power generated by the photovoltaic power generator during occurrence of the power fluctuations. For example, if the desired objective comprises smoothing the power generated by the photovoltaic power generator during occurrence of the power fluctuations, then one or more electrical energy storage devices 26 may comprise a capacitor bank, an inductor, and/or a super-capacitor. Conversely, if the desired objective comprises shaving a peak of the power generated by the photovoltaic power generator during occurrence of the power fluctuations, then one or more electrical energy storage devices 26 may be rechargeable batteries.

As further illustrated in FIG. 3, in one example embodiment, power buffering circuitry 16 may include a state-of-charge (SOC) monitor 28, as may be arranged to determine respective SOC information regarding energy storage devices 26. The SOC information may be used by controller 18 to further determine an appropriate control action to control the power-buffering circuitry in view of power generation fluctuations and in view of an appropriate charge/discharge regulation for a given energy storage device 26. For example, an appropriate charge/discharge regulation may result in improved life cycle performance of a battery.

Figure 4:
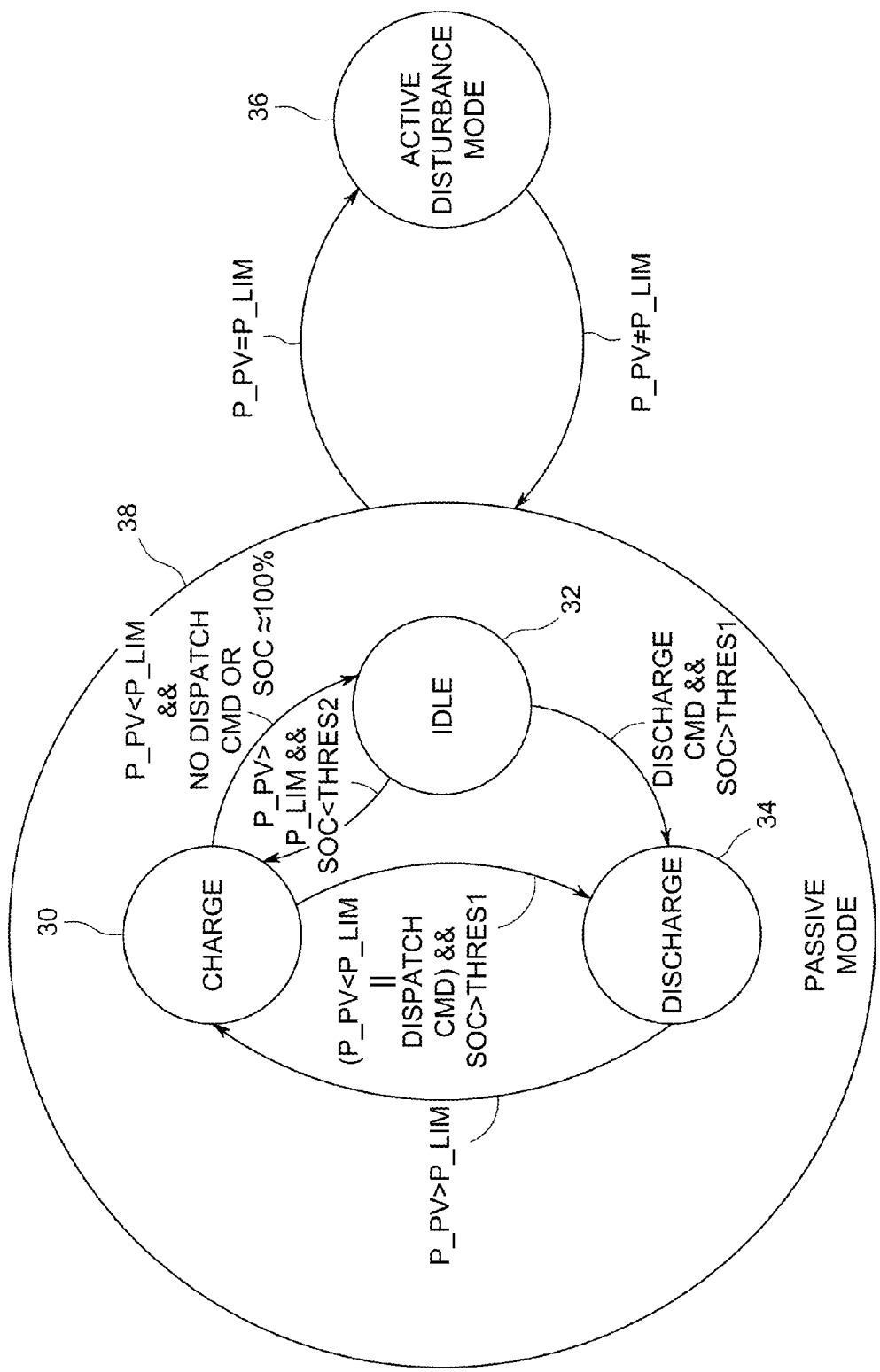
FIG. 4 is a state diagram illustrating example states of a power-buffering circuitry embodying aspects of the present invention.

FIG. 4 is one example state diagram illustrating example states in connection with a power-buffering circuitry embodying aspects of the present invention. In one example embodiment, when a level of power generated by photovoltaic power generator 10 exceeds a power rating limit of inverter 14 (e.g., P_pv>P_lim), the control action performed by controller 18 may comprise a command to divert excess power generated by photovoltaic power generator 10 and electrically charge (e.g., during a charging state 30 (labeled Charge)) one or more electrical energy storage device 26 by an amount sufficient to satisfy the power rating limit of inverter 14.

In one example embodiment, if in charging state 30, when a level of power generated by photovoltaic power generator 10 is below a power rating limit of inverter 14 (e.g., P_pv<P_lim), and in an absence of a dispatch command, the control action performed by controller 18 may comprise a command to set the power-buffering circuitry to an idle state 32 (labeled Idle); or, when the SOC of electrical energy storage devices 26 is practically in a fully charged condition (e.g., SOC≈100%), irrespective of the level of power generated by photovoltaic power generator 10 and the condition of the dispatch command, then energy storage devices 26 should be switched to idle state 32 so as to prevent an overcharging condition. In one example embodiment, one may revert to charging state 30 from idle state 32, when the level of power generated by photovoltaic power generator 10 exceeds the power rating limit of inverter 14 (e.g., P_pv>P_lim) and the SOC of electrical energy storage devices 26 is below a threshold level (e.g., Thres2), which may be appropriate for accepting a next charging cycle.

Figure 9:
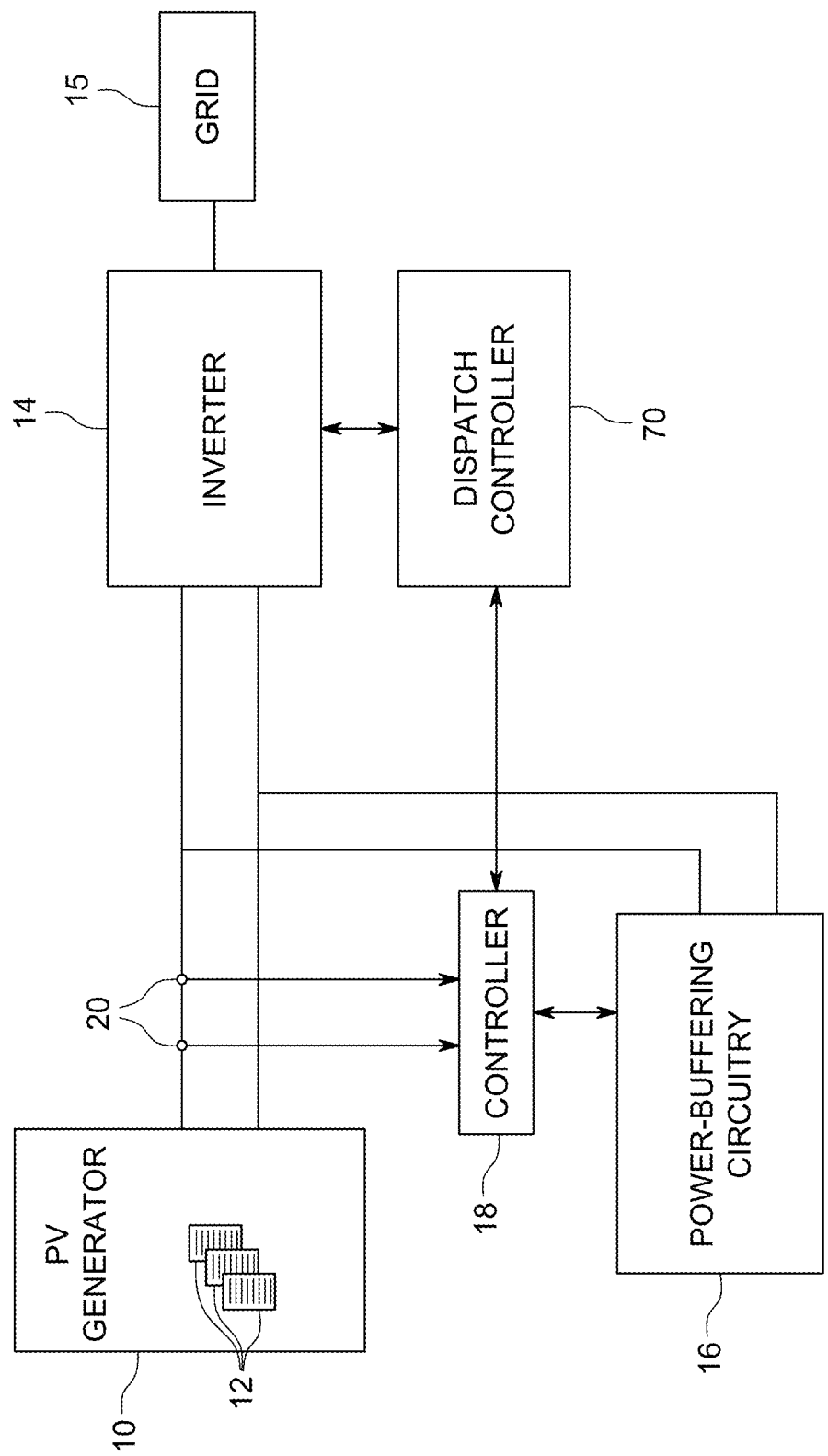
FIG. 9 primarily shows a block diagram representation of another example embodiment of a power generation system, where a power-buffering circuitry embodying aspects of the present invention may be integrated with a dispatch controller.

In one example embodiment, one may reach a discharging state 34 (labeled Discharge), when a level of power generated by the photovoltaic power generator is below a power rating limit of inverter 14 (e.g., P_pv<P_lim), provided a dispatch command is issued, and the SOC of electrical energy storage device 26 is above a threshold level (e.g., Thres1) supportive of a discharging event. For example, this threshold level may be arranged to protect a battery from an over-discharging condition. In this case, the control action performed by the controller 18 may comprise a command to electrically discharge one or more electrical energy storage devices by an amount sufficient to meet the dispatch command, as may be generated by a dispatch controller 70 (FIG. 9).

In an example state 36 (labeled Active Disturbance Mode), controller 18 may be configured to monitor whether inverter 14 is in a power curtailment mode, and if so, to generate a disturbance command (e.g., a charging current command) to terminate the power curtailment mode of the inverter and return power-buffering circuitry 16 to a state 38 (labeled Passive Mode), as may encompass any of states 32, 34 or 36. It should be appreciated that the foregoing example state diagram (and FIGS. 5-7 to be described below) involve control actions in connection with the power-buffering circuitry described in terms of a power rating limit. It is noted that the foregoing should be construed in an example sense and not in a limiting sense since, as described above, the control actions in connection with the power-buffering circuitry may also be performed in response to changes in the operational states of inverter 14 and/or sensed parameters of photovoltaic power generator 10 and/or inverter 14, which may be indicative of such changes in the operational states of inverter 14.

As will be appreciated by those skilled in the art, there may be many different approaches/algorithms that can be used to detect occurrence of an inverter state change. For example, presuming a situation where P_lim information of the inverter is not available, then if controller 18 detects a change (e.g., increase or decrease) in the PV voltage and/or current while the amount of PV power being generated remains practically the same before and after the change, then in one example embodiment controller 18 can make a preliminary determination that inverter 14 has entered a power curtailment mode. Based on this determination, controller 18 may then activate power buffering circuitry 16 to absorb surplus PV power and this would automatically bring the inverter from a power curtailment mode into a MPPT operation mode. The foregoing example of inverter state change is not intended to limit aspects of the present invention since many additional types of inverter state changes may be utilized to control the power-buffering circuitry in view of power generation fluctuations.

Figure 5:
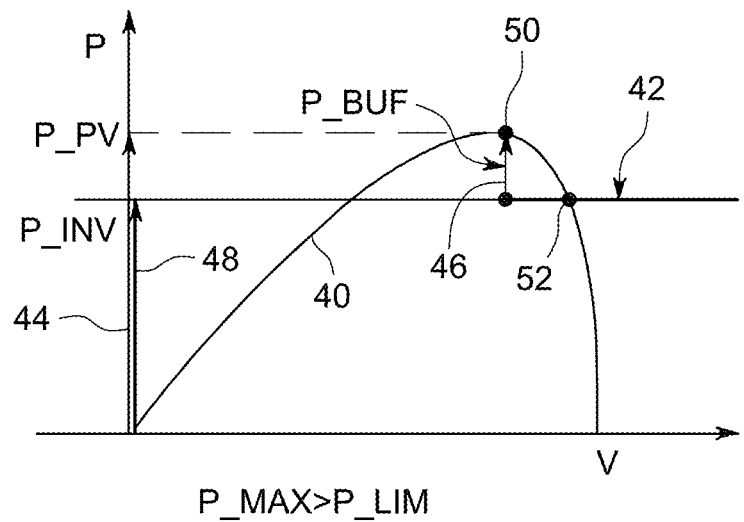
FIG. 5 shows an example power-voltage (P-V) curve of a photovoltaic (PV) power generator and illustrates an example steady-state operation of a power generation system including a power-buffering circuitry embodying aspects of the present invention, such as when a level of power generated by the photovoltaic power generator exceeds a power rating limit of an associated inverter (e.g., $P\_pv > P\_lim$).

FIG. 5 shows an example power-voltage (P-V) curve 40 of photovoltaic power generator 10 and illustrates an example steady-state operation of a power generation system including power-buffering circuitry 16, such as when a level of power generated by the photovoltaic power generator exceeds the power rating limit of inverter 14 (e.g., P_pv>P_lim). Horizontal line 42 represents the power rating limit of inverter 14. Vertical line 44 represents power generated by photovoltaic power generator 10. Vertical line 46 (labeled P_buf) represents the amount of power, which is diverted (e.g., stored in a storage unit) by power-buffering circuitry 16, which allows meeting the power limit of the inverter, and which allows photovoltaic power generator 10 to operate at a maximum power point 50 on P-V curve 40. It will be appreciated that without power-buffering circuitry 16, photovoltaic power generator 10 would operate at a non-maximum point 52 on P-V curve 40, which clearly would result in a sub-optimal operation of photovoltaic power generator 10. Vertical line 48 (labeled P_inv) represents the resulting inverter power, which meets the power rating limit of inverter 14.

Figure 6:
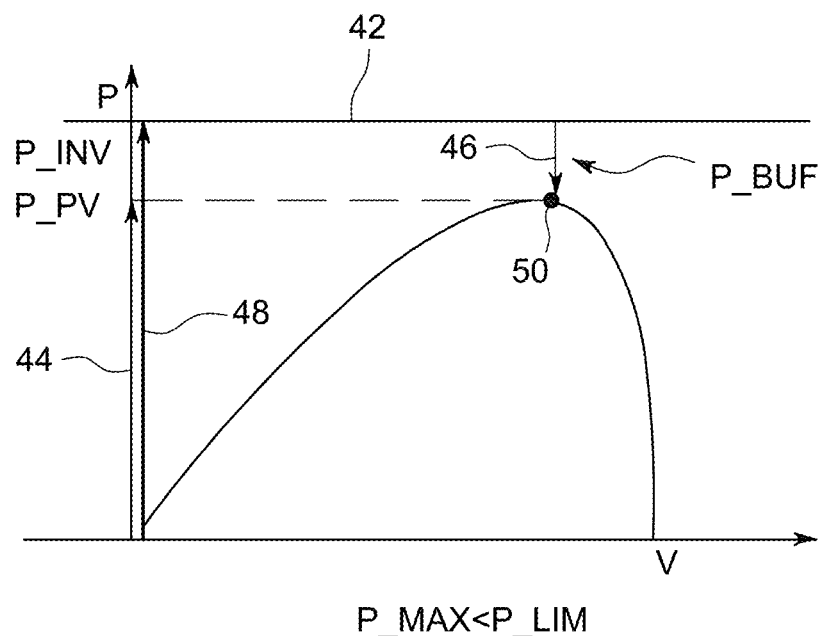
FIG. 6 shows an example power-voltage (P-V) curve of a photovoltaic (PV) power generator and illustrates another example steady-state operation of a power generation system including a power-buffering circuitry embodying aspects of the present invention, such as when a level of power generated by the photovoltaic power generator is below a power rating limit of an associated inverter (e.g., $P\_pv < P\_lim$).

FIG. 6 shows an example power-voltage (P-V) curve of photovoltaic power generator 10 and illustrates one example steady-state operation of a power generation system including power-buffering circuitry 16, such as when a level of power generated by the photovoltaic power generator is below a power rating limit of inverter 14 (e.g., P_pv<P_lim). Horizontal line 42 represents the power rating limit of inverter 14. Vertical line 44 represents power generated by photovoltaic power generator 10. Vertical line 46 (labeled P_buf) represents the amount of power, which is supplied (e.g., from a storage unit) by power-buffering circuitry 16, which allows meeting the power limit of the inverter, and which allows photovoltaic power generator 10 to operate at a maximum point 50 on P-V curve 40. Vertical line 48 (labeled P_inv) represents the resulting inverter power, which meets the power rating limit of inverter 14.

Figure 7:
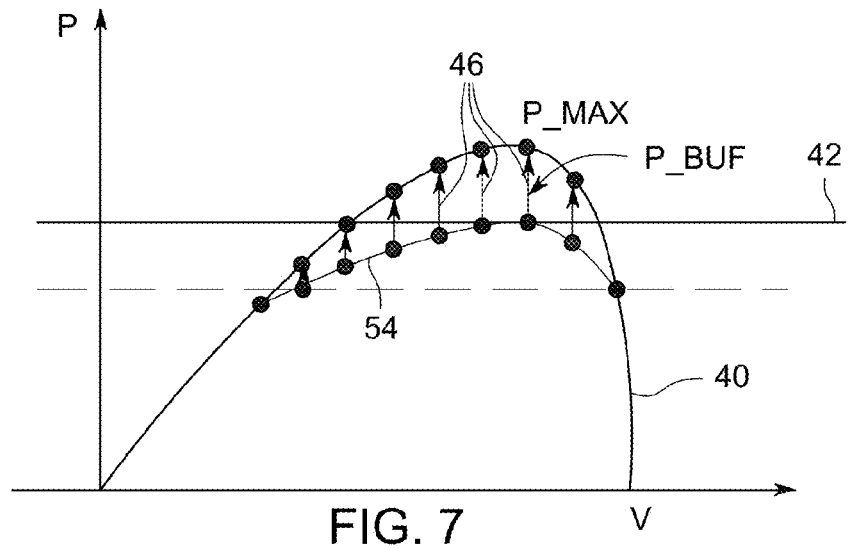
FIG. 7 shows an example power-voltage (P-V) curve of a photovoltaic (PV) power generator and illustrates an example dynamic operation of a power generation system including a power-buffering circuitry embodying aspects of the present invention, such as when the level of power generated by the photovoltaic power generator exceeds the power rating limit of an associated inverter (e.g., $P\_pv > P\_lim$).

FIG. 7 shows an example power-voltage (P-V) curve 40 of a photovoltaic (PV) power generator 10 and illustrates an example dynamic operation of a power generation system including a power-buffering circuitry embodying aspects of the present invention, such as when the level of power generated by the photovoltaic power generator exceeds the power rating limit of inverter 14 (e.g., P_pv>P_lim). Horizontal line 42 represents the power rating limit of inverter 14. Vertical lines 46 (labeled P_buf) represent a sequence of control actions performed by controller 18 to dynamically divert excess PV power (e.g., to be stored in a storage unit)), which allows meeting the power limit of the inverter under dynamically changing power fluctuations. Curve 54 represents the P-V curve, which is seen by the inverter, and which is fully compliant with the power rating limit (line 42) of inverter 14.

Figure 8:
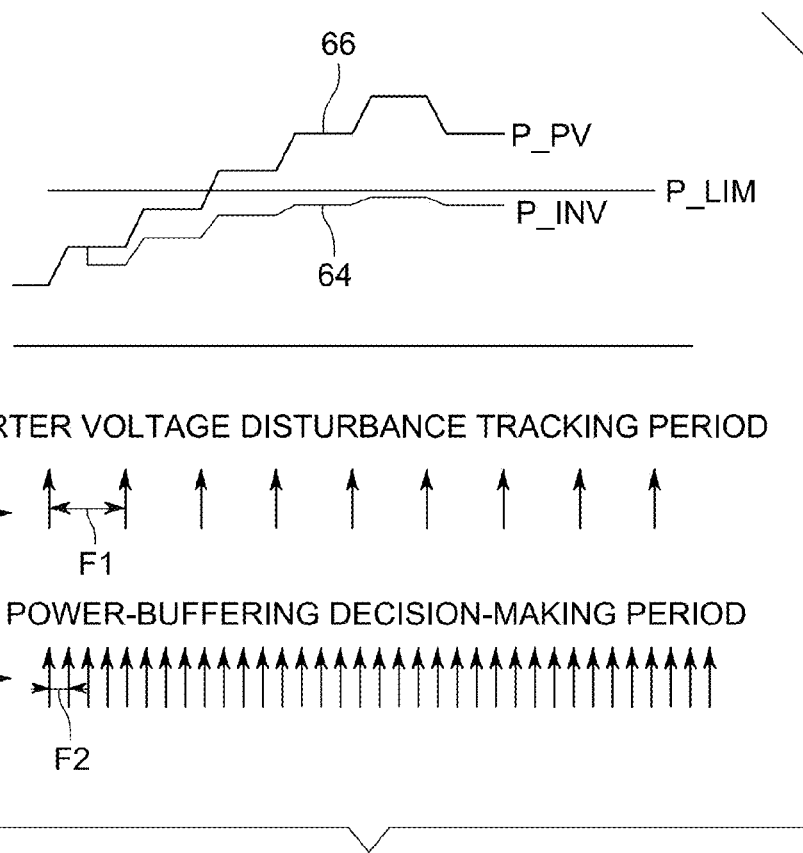
FIG. 8 shows respective waveforms, which may be helpful to conceptualize further aspects regarding a power-buffering circuitry embodying aspects of the present invention.

FIG. 8 shows respective waveforms, which may be helpful to conceptualize further aspects regarding a power-buffering circuitry embodying aspects of the present invention. Waveform 60 may indicate an example processing rate (e.g., first processing rate represented by frequency interval f1) of a maximum power point tracking, as may be performed as part of the standard control of inverter 14. Waveform 62 may indicate an example processing rate (e.g., a second processing rate represented by frequency interval f2) of control actions performed by controller 18. In one example embodiment, the second processing rate (e.g., f2) may be sufficiently faster relative to the first processing rate (e.g., f1) to ensure the maximum power point tracking by the inverter (as may be represented by waveform 64) is unaffected notwithstanding occurrence of dynamically changing power fluctuations (as may be represented by waveform 66).

As illustrated in FIG. 9, it is contemplated that in one example embodiment, controller 18 may be further responsive to a dispatch controller 70, as may be configured to evaluate dispatch costs relative to a discharging even, to add further intelligence for controlling power buffering circuitry 16. In one example application, this may enable a utility to co-optimize an integrated use of demand response (DR) (e.g., curtailment events to mitigate peak load conditions) and energy storage resources, such as may be used during a discharging event to supply electrical energy, which may also be used to mitigate such peak load conditions, or other conditions that require load reductions, such as contingencies. For example, there may be situations where a DR event may be relatively more cost-effective than electrically discharging the electrical energy storage devices. Thus, in such an example situation, no dispatch command would be generated by dispatch controller 70, and the control action performed by controller 18 would be to set the power-buffering circuitry to idle. For readers desirous of general background information regarding co-optimization of utilization of demand response and energy storage resources reference is made to U.S. patent application Ser. No. 13/451,851, filed on Apr. 20, 2012, and which is incorporated herein by reference.

Figure 10:
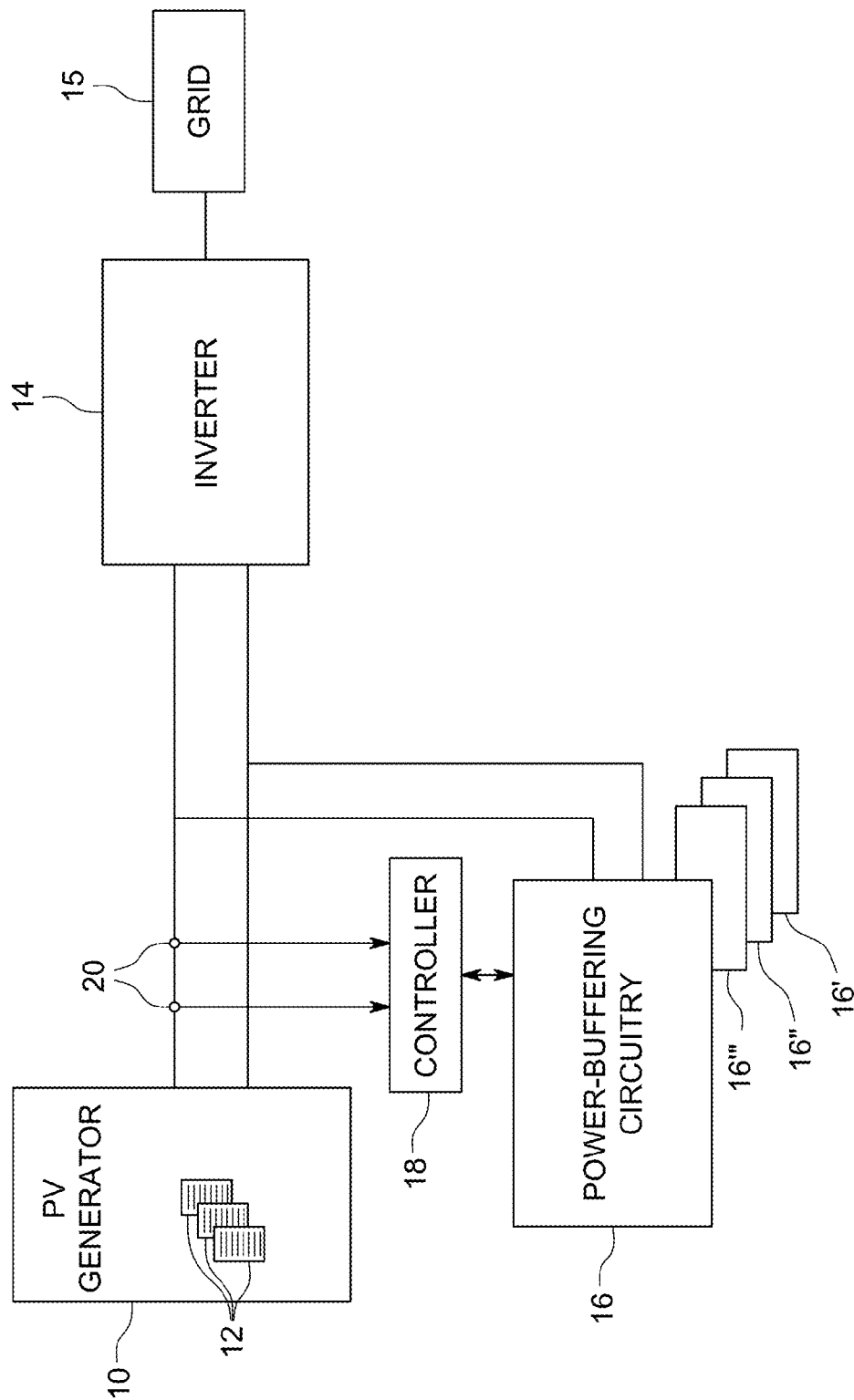
FIG. 10 primarily shows a block diagram representation of an example embodiment comprising a scalable and/or upgradeable power-buffering architecture, such as may be made up of a plurality of power buffering modules.

In one example embodiment, as illustrated in FIG. 10, power buffering circuitry may comprise a scalable and/or upgradeable power-buffering architecture, such as may be made up of a plurality of power buffering modules 16', 16", 16''', as may be connectable in parallel circuit between PV generator 10 and inverter 14. This may provide an end user (e.g., a utility) with a cost-effective, scalable and/or upgradeable power-buffering solution over a wide range of sizes where, for example, each power buffering module may have a relatively smaller power/energy buffering capability but in combination could meet a substantial power/energy buffering capability, which may be targeted based on the specific needs of a given utility; or where, for example, the characteristics of the respective electrical energy storage devices in such power buffering modules may be appropriately mixed and matched based on a wide range of target objectives to meet with excess power generated by the photovoltaic power generator during occurrence of the power fluctuations. In one example embodiment, power buffering modules 16', 16", 16''' may be responsive to respective controllers (not shown), such as may provide decentralized control to such power buffering modules. In another example embodiment, controller 18 may be adapted to appropriately coordinate the operation of such multiple power buffering modules, such as may provide centralized control to such power buffering modules.

In one example application, a power generation system including a power-buffering circuitry embodying aspects of the present invention, may be conveniently utilized in a solar farm, where the DC power rating (e.g., PV power rating) may be greater than the AC power rating (e.g., inverter rating). That is, the DC/AC ratio of the solar farm may be larger than unity. For example, increasing DC/AC ratios tend to give rise to more opportunities of power fluctuations and/or power losses, such as may occur under variable cloud coverage. Aspects of the present invention may provide a convenient building block (or add-on block) that may be conveniently integrated into an existing solar farm to buffer power fluctuations, which may be aggravated in the context of solar farms involving higher DC/AC ratios. Power quality may be improved while more PV energy may be efficiently captured resulting in a better annual energy production (AEP) while keeping system retrofit at a relatively low cost.

It will be appreciated that aspects of an example inventive system—as may be used to provide co-optimized utilization of power buffering and energy storage resources—and methods disclosed herein may be implemented by any appropriate processor system using any appropriate programming language or programming technique. The system can take the form of any appropriate circuitry, such as may involve a hardware embodiment, a software embodiment or an embodiment comprising both hardware and software elements. In one embodiment, the system may be implemented by way of software and hardware (e.g., processor, sensors, etc), which may include but is not limited to firmware, resident software, microcode, etc. Furthermore, parts of the processor system can take the form of a computer program product accessible from a computer-usable or computer-readable medium providing program code for use by or in connection with a computer or any instruction execution system. Examples of computer-readable media may include non-transitory tangible computer-readable media, such as a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. An interface display may be a tablet, flat panel display, PDA, or the like.

In one example embodiment, a processing system suitable for storing and/or executing program code may include in one example at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A power generation system comprising:
a photovoltaic power generator;
at least one inverter coupled to the photovoltaic power generator, said at least one inverter subject to at least one operational constraint;
a power-buffering circuitry connected between the photovoltaic power generator and said at least one inverter to buffer power generation fluctuations which can occur in power generated by the photovoltaic power generator, and satisfy said at least one operational constraint of the inverter notwithstanding an occurrence of the power generation fluctuations; and
a controller coupled to the power-buffering circuitry and responsive to at least one parameter of said at least one photovoltaic power generator to perform at least one control action regarding the power fluctuations, wherein the at least one parameter comprises at least one of a voltage of the generator and a current of the generator, wherein said at least one control action is performed by the controller independently of a control strategy of the inverter such that the control action is decoupled from control algorithms of the inverter.

2. The power generation system of claim 1, wherein the controller is further responsive to at least one parameter of said at least one inverter, and/or data indicative of a change in an operational state of the inverter to perform said at least one control action regarding the power fluctuations.

3. The power generation system of claim 1, wherein the controller is further responsive to a dispatch command to perform said at least one control action regarding the power fluctuations.

4. The power generation system of claim 1, wherein the power-buffering circuitry comprises a converter and at least one electrical energy storage device.

5. The power generation system of claim 4, further comprising a monitor arranged to monitor a state-of-charge of said least one electrical energy storage device, and further wherein the controller is further responsive to the monitored state-of-charge of said at least one electrical energy storage device to perform said at least one control action regarding the power fluctuations.

6. The power generation system of claim 4, wherein the converter comprises a DC-to-DC converter.

7. The power generation system of claim 4, wherein said at least one operational constraint of the inverter is selected from a group consisting of a power rating limit, a current rating limit, a voltage rating limit, and a temperature rating limit of at least one component of said at least one inverter.

8. The power generation system of claim 7, wherein the controller is configured for, when a level of power generated by the photovoltaic power generator exceeds the power rating limit of said at least one inverter, providing said at least one control action in the form of a command to divert excess power generated by the photovoltaic power generator and electrically charge said at least one electrical energy storage device by an amount sufficient to satisfy the power rating limit of said at least one inverter.

9. The power generation system of claim 4, wherein the controller is configured for, when a level of power generated by the photovoltaic power generator is below a power rating limit of said at least one inverter, and in an absence of a dispatch command, providing said at least one control action in the form of a command to set the power-buffering circuitry to an idle mode.

10. The power generation system of claim 4, wherein the controller is configured for, when a level of power generated by the photovoltaic power generator is below a power rating limit of said at least one inverter and upon a dispatch command, providing said at least one control action in the form of a command to electrically discharge said at least one electrical energy storage device by an amount sufficient to meet said dispatch command.

11. The power generation system of claim 1, wherein the power-buffering circuitry comprises a plurality of power buffering modules connectable in parallel circuit between the photovoltaic power generator and said at least one inverter, and further wherein the power-buffering circuitry formed by the plurality of power buffering modules comprises an upgradeable and/or scalable power-buffering circuitry.

12. The power generation system of claim 11, further comprising respective controllers coupled to the plurality of power buffering modules to provide decentralized control to the plurality of power buffering modules.

13. The power generation system of claim 11, wherein the plurality of power buffering modules are coupled to said controller which is configured to provide centralized control to the plurality of power buffering modules.

14. The power generation system of claim 1, further comprising at least one sensor to sense said at least one parameter of the photovoltaic power generator and/or said at least one inverter.

15. The power generation system of claim 1, further comprising a data link to monitor said at least one parameter of the photovoltaic power generator and/or said at least one inverter and/or monitor data indicative of a change in an operational state of the inverter.

16. The power generation of claim 1, wherein the controller is configured for, when the inverter is operating in a maximum power point tracking mode which is processed at a first processing rate, processing said at least one control action at a second processing rate, wherein the second processing rate is faster relative to the first processing rate.

17. The power generation of claim 1, wherein said at least one control action is configured so that the photovoltaic power generator operates at a maximum power point while satisfying said at least one operational constraint of the inverter notwithstanding occurrence of the power fluctuations.

18. The power generation of claim 1, wherein the controller is configured to monitor whether said at least one inverter is in a power curtailment mode, and if so, generate a disturbance command to terminate the power curtailment mode of the inverter.

19. The power generation of claim 1, wherein the power-buffering circuitry comprises a converter and at least one electrical energy storage device, and wherein said at least one electrical energy storage device is selected based on a desired objective to meet with excess power generated by the photovoltaic power generator during occurrence of the power fluctuations.

20. The power generation of claim 19, wherein the desired objective comprises smoothing the power generated by the photovoltaic power generator during occurrence of the power fluctuations, and wherein said at least one electrical energy storage device is selected from a group consisting of a capacitor bank, an inductor, and/or a super-capacitor.

21. The power generation of claim 19, wherein the desired objective comprises shaving a peak of the power generated by the photovoltaic power generator during occurrence of the power fluctuations, and wherein said at least one electrical energy storage device comprises at least one rechargeable battery.

22. The power generation of claim 1, wherein the photovoltaic power generator comprises an array of photovoltaic modules.

23. Apparatus comprising:
a power-buffering circuitry connected downstream from a photovoltaic power generator and upstream from at least one inverter coupled to the photovoltaic power generator, said at least one inverter subject to at least one operational constraint, the power-buffering circuitry arranged to buffer power generation fluctuations which can occur in power generated by the photovoltaic power generator, and satisfy said at least one operational constraint of the inverter notwithstanding an occurrence of the power generation fluctuations; and
a controller coupled to the power-buffering circuitry and responsive to at least one parameter of said at least one photovoltaic power generator to perform at least one control action regarding the power fluctuations, wherein the at least one parameter comprises at least one of a voltage of the generator and a current of the generator, wherein said at least one control action is performed by the controller independently of a control strategy of the inverter such that the control action is decoupled from control algorithms of the inverter.

24. The apparatus of claim 23, wherein the controller is further responsive to at least one parameter of said at least one inverter, and/or data indicative of a change in an operational state of the inverter to perform said at least one control action regarding the power fluctuations.

25. The apparatus of claim 23, wherein the controller is further responsive to a dispatch command to perform said at least one control action regarding the power fluctuations.

26. The apparatus of claim 23, wherein the power-buffering circuitry comprises a converter and at least one electrical energy storage device.

27. The apparatus of claim 23, wherein the power-buffering circuitry comprises a plurality of power buffering modules connectable in parallel circuit between the photovoltaic power generator and said at least one inverter, and further wherein the power-buffering circuitry formed by the plurality of power buffering modules comprises an upgradeable and/or scalable power-buffering circuitry.

28. The apparatus of claim 26, further comprising a monitor arranged to monitor a state-of-charge of said least one electrical energy storage device, and further wherein the controller is further responsive to the monitored state-of-charge of said least one electrical energy storage device to perform said at least one control action regarding the power fluctuations.

29. The apparatus of claim 26, wherein the converter comprises a DC-to-DC converter.

* * * * *